UNITED STATES PATENT OFFICE.

AMZI L. BARBER, OF WASHINGTON, DISTRICT OF COLUMBIA, ASSIGNOR TO THE BARBER ASPHALT PAVING COMPANY, OF SAME PLACE.

ASPHALTIC CEMENT FOR PAVING, ROOFING, &c.

SPECIFICATION forming part of Letters Patent No. 330,197, dated November 10, 1885.

Application filed July 21, 1884. Renewed October 3, 1885. Serial No. 178,949. (No specimens.)

*To all whom it may concern:*

Be it known that I, AMZI L. BARBER, a citizen of the United States, residing at Washington, in the District of Columbia, have invented certain new and useful Improvements in Asphaltic Cements for Paving, Roofing, &c., of which the following is a specification.

My invention relates to improvements in asphaltic cements for use in concrete pavements, for roofing, and other purposes.

The object of my invention is to produce an asphaltic cement which which will not oxidize or disintegrate by exposure to the atmosphere or to gases, water, and other liquids; and to this end my invention consists in combining with Trinidad or other like hard or dry asphaltum the natural liquid or semi-liquid asphaltum—such as is found in Trinidad, Mexico, Venezuela, Southern California, and elsewhere—whereby the hard and dry asphaltum is reduced to a plastic condition, as will more fully appear.

For use in the various arts, the natural asphalt rock has been reduced to a liquid or semi-liquid condition by means of alcohol, turpentine, and various other solvents, while for roofing and paving purposes the residuum of petroleum or the products arising from the distillation of petroleum, and even the crude petroleum-oil, have been used to good advantage in reducing the hard asphaltum to a proper consistency for being combined with sand, pulverized stone, and other material.

Petroleum residuum or the products arising from the distillation of petroleum-oil, the various coal-tar products, and all artificial bitumens have more or less volatile or oxidizable substances contained therein, and when exposed to the elements undergo certain changes which detract from their value as an ingredient in paving and roofing compounds. The oxidizing and disintegrating effect of the atmosphere, water, gases, &c., together with the injurious effect of the urine of animals, tends to shorten the life or usefulness of a pavement in which these artificial asphalts are used, and to overcome these defects is the object of my present invention.

The natural hard or dry asphalts—such as the Trinidad and others of like character—have by the lapse of time (possibly of ages) been subjected to all the changes possible and have been deprived of all their volatile elements and are completely oxidized, so that when laid in a pavement further deterioration or oxidization cannot take place. The same state of facts exists with regard to the softer or naturally-liquid asphalts—such as the Trinidad, Mexican, Venezuelan, Californian, and others—and it is by combining the naturally dry or hard asphalt with the soft or naturally liquid asphalt that I am enabled to produce a composition having valuable qualities as a paving or roofing compound.

In carrying out my invention, I mix with any suitable quantity of the Trinidad asphalt a sufficient quantity of the Trinidad, Mexican, Venezuelan, or other naturally liquid asphalt to dissolve the hard asphalt and reduce it to a plastic condition. This reduction may be facilitated by the action of heat, which may be applied in any suitable or convenient manner, and the quantity of liquid asphalt required can only be determined by actual test, dependent on the absorbent qualities of the hard asphalt. Enough of the liquid asphalt, however, should be added to reduce the mass to a plastic or semi-plastic condition at a temperature of 60° Fahrenheit. The composition thus formed is an asphaltic cement superior to any asphaltic cement heretofore used, and is especially adapted to form the cementing material of an asphalt pavement and for roofing purposes. This cement is mixed with sand, pulverized, ground, or finely-comminuted limestone, or other suitable materials, in the same manner as is now in common use in the United States. This cement is also equally well adapted to be used in the manufacture of asphalt paving-blocks when mixed with proper proportions of crushed rock, sand, or other material which will adapt the same to be pressed or molded into blocks.

Having thus described my invention, what I claim, and desire to secure by Letters Patent, is—

1. A cement or compound for paving and roofing purposes, composed of Trinidad or similar hard asphalt reduced and combined with Trinidad, Mexican, Venezuelan, or other naturally liquid or soft asphalt, as set forth.

2. A paving or roofing composition consisting of Trinidad or other similar asphalt combined with Trinidad, Mexican, Venezuelan, or other naturally soft or liquid asphalt, sand, and pulverized limestone, as set forth.

In testimony whereof I affix my signature in presence of two witnesses.

AMZI L. BARBER.

Witnesses:
R. M. RICHARDS,
JAMES H. SMITH.